(No Model.)
2 Sheets—Sheet 1.
C. C. HENDERSON.
SULKY CORN AND SEED PLANTER.
No. 324,322.
Patented Aug. 11, 1885.
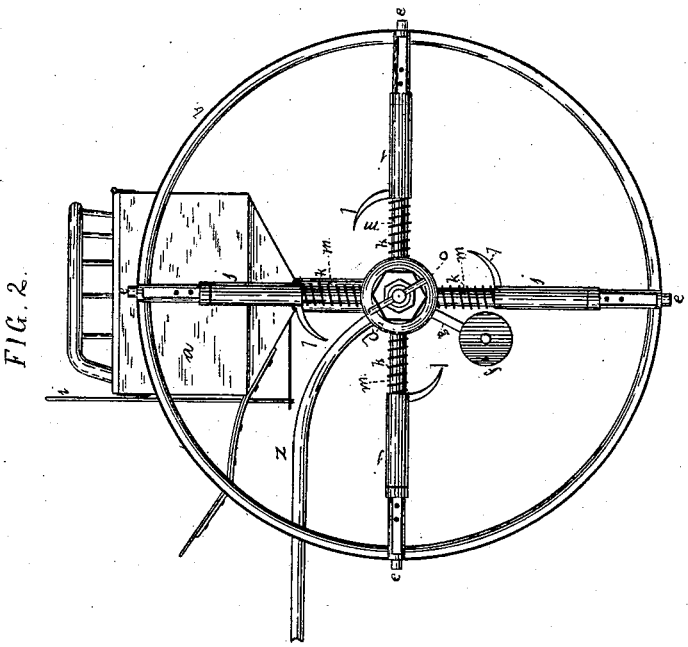
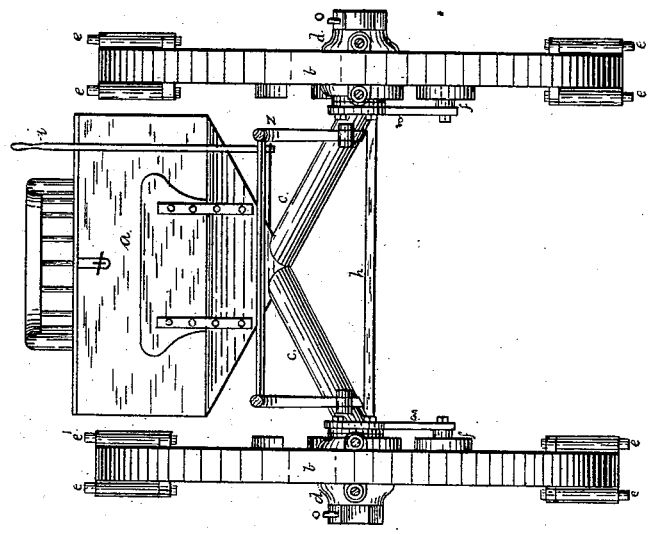
WITNESSES
Orren C. Allen
George C. Hamilton
INVENTOR
Charles Carroll Henderson
By his Attorney
Geo. H. Higgins (No Model.) 2 Sheets—Sheet 2.
C. C. HENDERSON.
SULKY CORN AND SEED PLANTER.
No. 324,322. Patented Aug. 11, 1885.
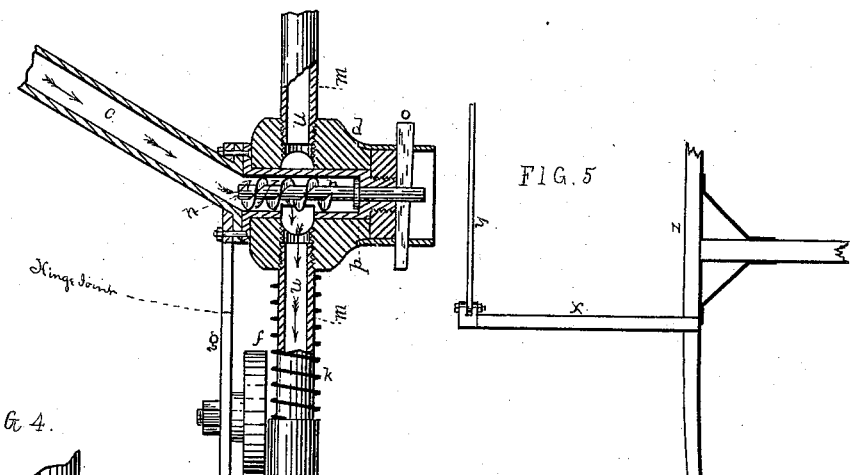
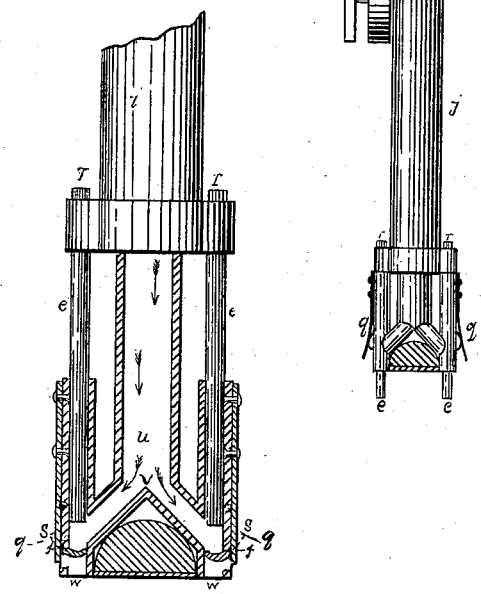

UNITED STATES PATENT OFFICE.

CHARLES CARROLL HENDERSON, OF WARREN, PENNSYLVANIA, ASSIGNOR OF ONE-HALF TO ORREN C. ALLEN AND GEORGE H. HIGGINS, OF SAME PLACE.

SULKY CORN AND SEED PLANTER.

SPECIFICATION forming part of Letters Patent No. 324,322, dated August 11, 1885.

Application filed February 4, 1885. (No model.)

*To all whom it may concern:*

Be it known that I, CHARLES CARROLL HENDERSON, a citizen of the United States, residing at Warren, in the county of Warren and State of Pennsylvania, have invented a new and useful machine, which I designate as the "Henderson Sulky Corn and Seed Planter," and that, according to my knowledge and belief, the same has never been patented to myself or to others with my knowledge and consent in this or any other country, and that the same has not been in public use or on sale in the United States for more than two years prior to this application, of which the following is a specification.

The object of the said invention is to equally distribute the corn or other seed in hills at regular intervals, planting two rows at one time, and burying the corn or other seed by the use of plungers attached to the spokes of the wheels, which spokes are hollow and fed by a hollow hub and axle, the bulk of corn being carried in a box or reservoir above the axle.

Figure 1 represents a front view of the Henderson sulky corn and seed planter. Fig. 2 represents a side view of said planter. Fig. 3 shows inside of hollow axle and hub with agitator inside of said hub and axle; also inside view of hollow spokes at and near hub. Fig. 4 shows inside of lower part of spoke (or the part next to the rim of wheel) with plungers attached to sleeve, and with valves or cams to keep the corn or other seed from dropping out when plunger is raised. Fig. 5 shows thill with marker attached. Fig. 6 shows lower part of plunger concaved in lower end.

Similar letters refer to similar parts throughout the several views.

The box or reservoir *a*, for carrying the corn or other seed, is attached to and placed above the axle *c c*, which axle is hollow and is sufficiently inclined from the center each way toward the hubs *d d* to allow the corn or other seed to run from said box or reservoir *a* through said hollow axle into said hubs, which are also hollow. To said hubs are connected four hollow spokes, *m m m m*, which spokes receive the corn or other seed from said hollow hubs, the corn or other seed thus conducted into *u*, (which represents hollow in spoke,) to a point at *v*, where it diverges and passes out at the two apertures *w w*, one on each side of rim of wheel. The corn or other seed having passed through the axle and hub, and having passed the diverging point *v*, is retained in spoke until the proper time by means of cam or valve *s s*, which cam or valve is fastened to and turns on rivet-bolt or hinge-joint *t t*, and is held in place by spring *q q*.

The plungers *e e* are fastened to sleeve *j* (which sleeve works on outside of spoke) by means of nut *r r*, and said sleeve and plungers are held down, as shown in Figs. 1, 2, and 3, by means of spiral spring *k*. The said plungers being in position as held by said spring—that is, projecting about one and one-half inch below the rim of wheel—are raised by means of flange *l* striking and riding upon and over the pulley-wheel *f*, which pulley-wheel is held in its proper position by the arm *g*, which arm is fastened to axle *c c*. The proper position of said pulley is such that the flange *l* passes off from said pulley at a point when the spoke to which said flange is attached is in a perpendicular position, the end to which the plungers are attached being down. The distance the plungers *e e* are raised is also governed by the position of the said pulley-wheel *f*, it being the intention to only raise said plungers far enough above the cams or valves *s s* to allow the required number of kernels of corn or other seed to lie between cam or valve and the bottom of said plunger. The bottom of said plungers *e e* being concave, as shown in Fig. 6, protects the corn or other seed from being bruised when the plungers drop onto said valve or cam. The spoke having reached the point where the flange *l* drops off from the pulley *f*, the said spiral spring forces the plungers *e e* down, striking the valve or cam *s s*, and forcing said valve or cam back, passes down through the aperture *w w*, carrying the corn or other seed with it into the ground, thus planting it.

Inside of axle $cc$ is an agitator, $n$, which is held in position by linchpin $o$, which linchpin is passed through the band of the hub $d$, and through the agitator $n$, causing the agitator to turn on its bearing between said linchpin $o$ and collar $p$. The object of the agitator is to keep the corn or other seed from clogging in hub and axle, and also to regulate the quantity of corn or seed which passes into the hollow spokes from the axle and hub.

In the arm $g$ is a hinge-joint, as designated and shown in Fig. 3, the purpose of which is to allow the pulley $f$ to be turned up out of the way of the flanges $l\ l\ l\ l$, when going to or from the field, or when wanting to drive the planter and not have it work, as in planting. The rim of wheels are designated by $b$. $h$ is an iron bar attached to axle $cc$, near each hub, to keep wheels from spreading. $i$ is a lever, to which is attached slide in bottom of box or reservoir $a$, to shut off corn or other seed from hollow axle $cc$. This lever $i$ is handled by person sitting in seat on top of box or reservoir $a$.

$x$ represents bar attached to thill $z$, to which bar $x$ is attached the marker $y$.

It is the intention to increase the size of the hollow in the axle, hub, and spoke gradually from the point where the corn or other seed enters the axle to the diverging point $v$ in spoke, the purpose being to guard against the corn or seed clogging.

Having thus fully described my invention, I claim and desire to secure by Letters Patent—

A planting-machine, with combination of hollow axle, hollow hubs, and hollow spokes, arranged and connected as described, so as to receive the seed to be planted from a reservoir above the axle and conduct the same to the ground.

CHARLES CARROLL HENDERSON.

Witnesses:
 ORREN C. ALLEN,
 GEORGE C. HAMILTON.